UNITED STATES PATENT OFFICE.

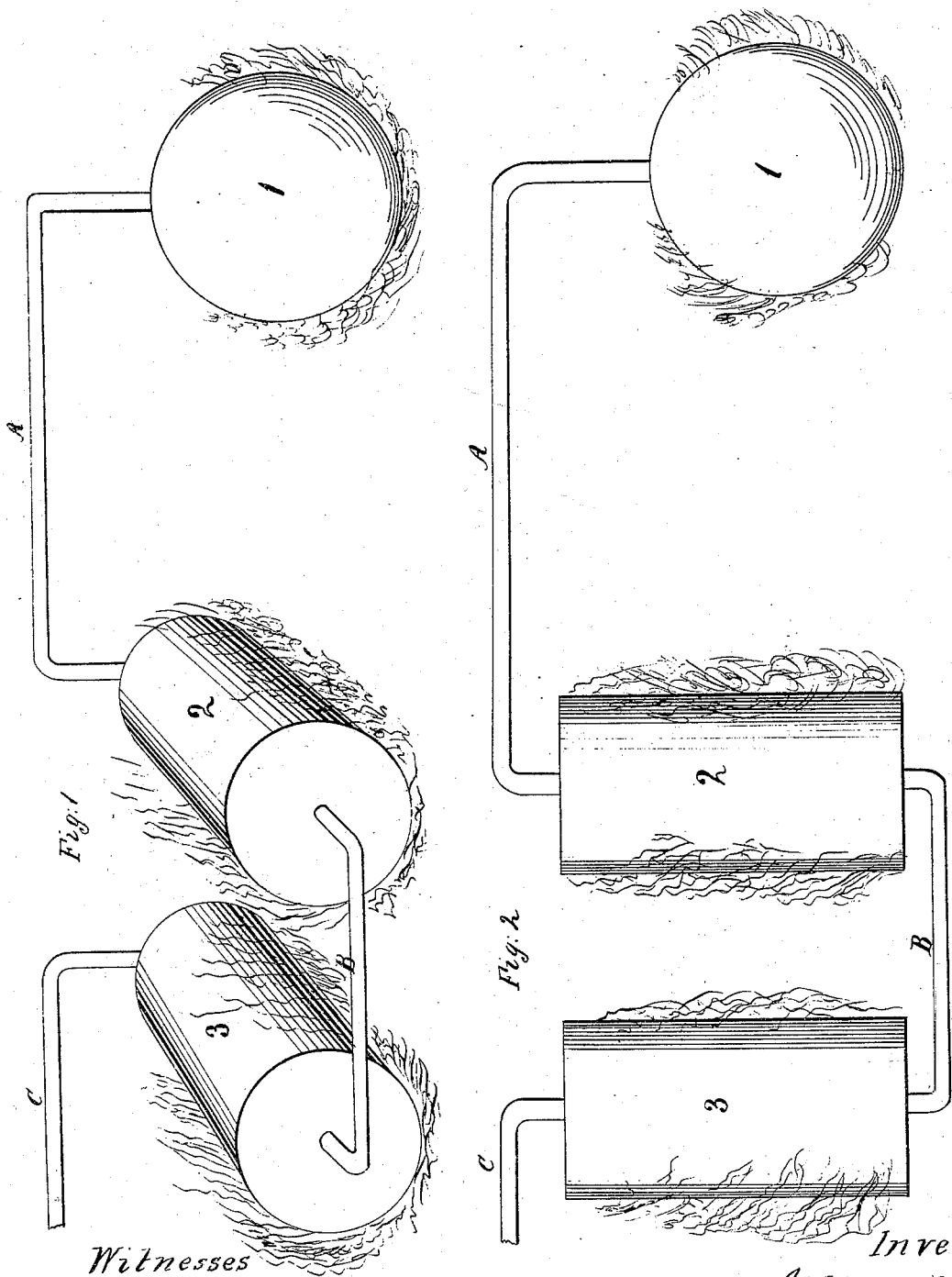

WILLIAM C. WREN AND WILLIAM BARKER, OF BROOKLYN, NEW YORK.

IMPROVED APPARATUS FOR THE MANUFACTURE OF GAS FROM PETROLEUM.

Specification forming part of Letters Patent No. 56,843, dated July 31, 1866.

*To all whom it may concern:*

Be it known that we, WILLIAM C. WREN and WILLIAM BARKER, both of the city of Brooklyn, in the county of Kings and State of New York, have invented a new and improved mode of making and producing gas for illuminating purposes from the basis of crude petroleum and kindred material; and we do hereby declare that the following is a full and exact description thereof, reference being had to the accompanying drawings, and to the letters of reference marked thereon.

The nature of our invention consists in the production of illuminating-gas from crude petroleum or other kindred material by the following process—that is to say:

We produce an intense heat in and throughout one or more superheaters, such as are marked 2 and 3 on the annexed diagram, the number used being governed by circumstances, and which may be of any desired shape, and which are filled with ashes or any other porous and absorbent matter; or the said superheaters may, instead of such ashes or other matter, be furnished with a screen or screens made of platinum, similar to a very fine sieve, placed across the inside of such superheaters, and so placed that any exhalations passing through the superheaters must pass through such screens or sieves.

The superheaters are heated by fires all around and over them. This is preparatory to the introduction of the exhalation of the heated petroleum or other kindred material from the heater marked 1 in the annexed diagram. This heater (containing the material for consumption placed therein upon a bed of ashes or other absorbent matter) is gradually heated by fire till it (the heater) becomes red-hot, and the exhalation produced from the material by the action of the heat passes, by a pipe marked A on the diagram, to and into the first of the superheaters, marked 2. At this point the exhalation passing through the heated ashes, screens, or sieves loses its hydrogen by absorption, wholly or in part.

If desirable for further depletion of hydrogen, the exhalation then passes through the pipe B on the diagram to and into the superheater marked 3, and so on, if necessary, into another superheater, until the exhalation becomes thoroughly purged of every particle of moisture, so that the pure gas passes at once from the last superheater to the gasometer or receiver, ready for use.

The object and effect of the use of the one or more superheaters are to separate and retain from the exhalation all its hydrogen, and to evolve and make free the purely gaseous matter. Otherwise the product would afterward condense, and, the vapor retaining the gas in a state of latency or resolvency, the result would simply present the effects of distillation.

We claim that by this process an illuminating-gas is produced furnishing a pure white light not less than threefold greater in illuminating-power than that produced by bituminous coal, or any other article in use for that purpose, and at a vastly cheaper expense of labor and fuel, as well as of material.

We claim that with twenty gallons of crude petroleum we can by this process produce ten thousand or more cubic feet of gas of the above or greater illuminating-power, as against ten thousand cubic feet of the inferior yellow-burning gas produced from a ton of bituminous coal.

The comparative bulk of twenty gallons of crude petroleum and of a ton of bituminous coal furnishes the relative proportions of expense of labor and fuel in producing the same quantity of gas, not to speak of the quality, and the difference in the cost of the material is equally in favor of our process—as, for example, the quotations in the market of December 12, 1865, are $18 to $22 per ton for bituminous coal against 41 to 42 cents per gallon for petroleum, making the material for the production of ten thousand cubic feet of coal-gas cost at the least $18 against $8.40 for the same result in quantity from petroleum.

We claim—

The process herein described of producing gas—to wit, by a combination of one or more heaters and superheaters (not less than one of each) continuously connected with each other by pipes, such heaters and superheaters fitted and filled as described in the foregoing specification, and by the peculiar combination, arrangement, and graduation of two or more fires, (not less than two,) as shown in specification, with an addition of more heaters, superheaters, and fires, as the quantity of gas to be produced may require.

Dated December 13, 1865.

WILLIAM C. WREN.
WILLIAM BARKER.

Witnesses:
DAVID C. RINGLAND,
JOSHUA CARHART.